United States Patent [19]

Wood

[11] 4,241,977
[45] Dec. 30, 1980

[54] AMUSEMENT DEVICE

[76] Inventor: Clifford Wood, Bob Hill Rd., Pound Ridge, N.Y. 10576

[21] Appl. No.: 59,208

[22] Filed: Jul. 20, 1979

[51] Int. Cl.³ ............................................. G02B 23/00
[52] U.S. Cl. ..................................................... 350/4.1
[58] Field of Search ......................................... 350/4.1

[56] References Cited

U.S. PATENT DOCUMENTS

| | | | |
|---|---|---|---|
| 3,809,879 | 5/1974 | Gonzalez | 350/4.1 X |
| 3,930,711 | 1/1976 | Powell | 350/4.1 |
| 4,172,629 | 10/1979 | Allen | 350/4.1 |

*Primary Examiner*—Richard A. Wintercorn
*Attorney, Agent, or Firm*—Roy C. Hopgood; John M. Calimafde; Charles W. Neill

[57] ABSTRACT

This specification describes an amusement device of the kaleidoscopic type where an observer looks down a tube having reflected inside surfaces or planes and usually with two such surfaces at an angle of approximately 45 degrees to one another. The sides of the tube are opaque; but a pair of transparent or translucent discs close the end of the tube opposite the end having the opening for looking along the reflective surfaces. In the prior art loose shapes disposed in the space between the transparent discs tumble over one another as the tube is rotated about its longitudinal axis and interesting designs are formed which appear in the reflectors. The construction of this specification has an opaque wall at the end of the tube and a portion of the tube is made of material that transmits light into the tube to illuminate the opaque end of the tube from the inside. There are no loose shapes in the target.

10 Claims, 6 Drawing Figures

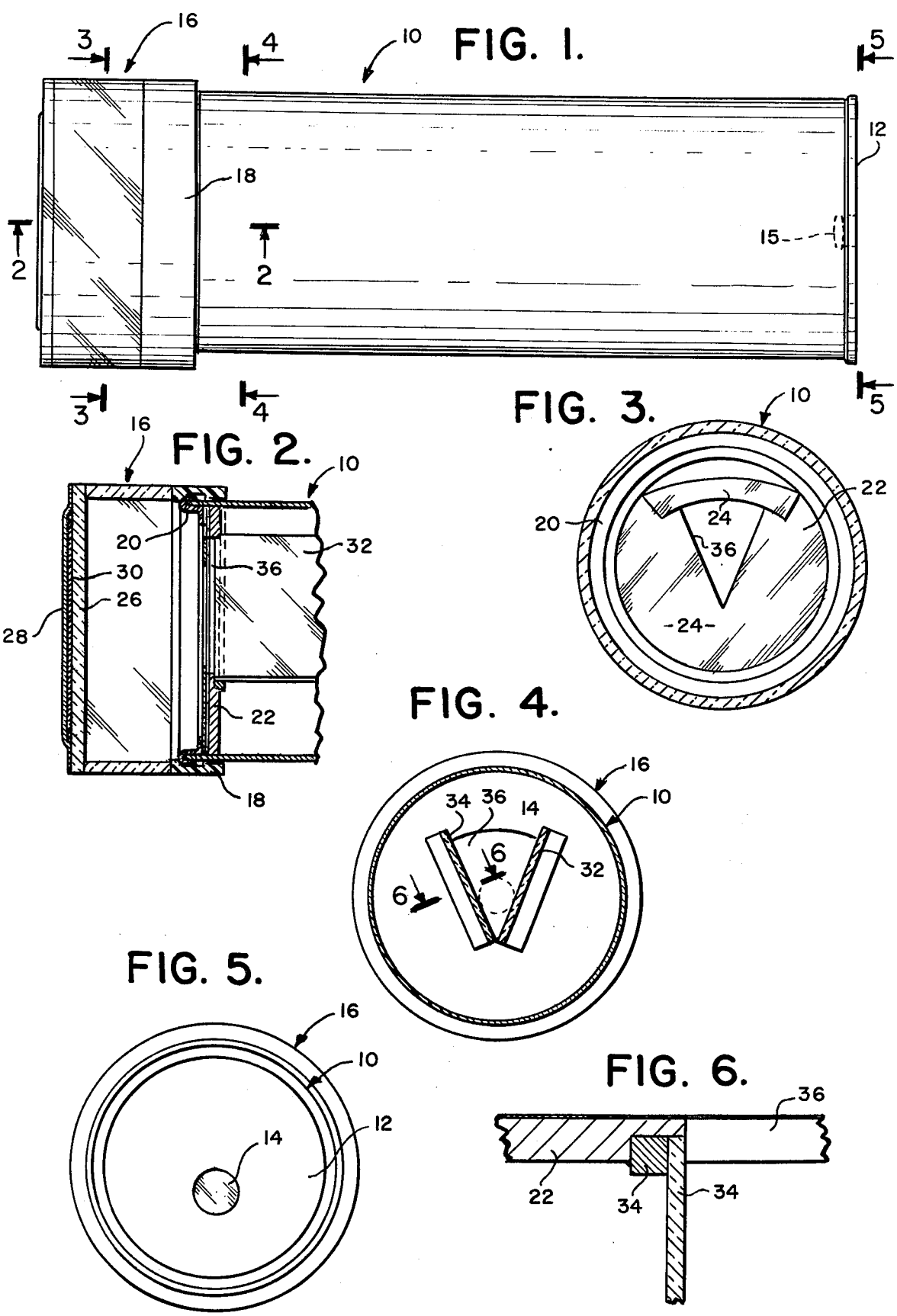

AMUSEMENT DEVICE

BACKGROUND AND SUMMARY OF THE INVENTION

Probably the oldest and best known kaleidoscopes has transparent or translucent panels at the end of the tube with glass beads and other loose material that fell into different positions to generate varying designs that were viewed in the reflecting, angularly related planes, through an opening in the end wall of the tube remote from the panels that confined the beads and other loose material.

A later type has silhouette pictures on loose but parallel panels and miscellaneous shapes confined between the end panels of the tube at the end opposite the viewing opening and the reflecting walls along the line of sight reproduced the silhouettes in angular relation to one another.

A simpler type of kaleidoscope does away with the loose particles confined between transparent panels and substitutes a window or lens at the end of the tube. The plane reflective surfaces at an angle to one another, usually 45 degress, reflect the image that enters the tube through the lens at the front end and interesting fields and colors are seen from the rearward end of the tube through an observation opening in line with the reflectors. It is no longer necessary to rotate the tube but horizontal or vertical movement produces certain mental images which are, in reality, bits of the scene ahead of the tube which is picked up by the lens.

This invention has a housing enclosing reflectors that are at an angle to one another and which have reflective surfaces facing one another, but the object viewed is preferably opaque so that no light passes through the end of the tube on its way to the viewing opening at the other end of the tube. The tube that contains the angularly related reflecting planes has a partition at the forward ends of the reflecting planes and the portion of the tube beyond this partition is constructed so as to admit light from outside the tube into the tube on the side of the partition opposite the reflecting surfaces so that the opaque end wall of the tube is illuminated by light passing into the tube through light admitting walls of the tube ahead of the partition.

In order to supply more light to illuminate the target, the portion of the area of the front of the partition which is beyond the transverse extent of the reflecting planes is made a reflecting surface for light which is transmitted through the sides of the tube, ahead of the partition, and in a direction toward the front surface of the partition. This light is reflected forward toward the target to increase the illumination of the target.

The side of the target area that faces the partition has a layer of material which changes in color in response to pressure applied by a finger to the closed end of the tube which is illuminated by the light which enters through the transparent portion of the tube wall at the target end of the tube. This material will be described more fully in connection with the description of the preferred embodiment.

The changes in color or pattern that are produced by rubbing a finger over the outside of the end wall (target area) of the device by exerting pressure from the outside, produce lines or recognizable images in response to finger pressure which are the result of movements by the operator and put the operator in control of the image and have a calming effect upon persons using the device.

Other objects, features and advantages of the invention will appear or be pointed out as the description proceeds.

BRIEF DESCRIPTION OF DRAWING

In the drawing, forming a part hereof, in which like reference characters indicate corresponding parts in all the views;

FIG. 1 is a side view, partly broken away and in section, of the amusement device of this invention;

FIGS. 2, 3 and 4 are enlarged sectional views taken on the lines 2—2, 3—3 and 4—4 of FIG. 1;

FIG. 5 is an enlarged end view taken on the line 5—5 of FIG. 1; and

FIG. 6 is a sectional view taken on the line 6—6 of FIG. 4.

DESCRIPTION OF PREFERRED EMBODIMENT

The structure shown in FIG. 1 includes a tube 10 which is preferably cylindrical. The rearward end of the tube 10 is closed an end wall 12 rigidly secured to the cylindrical portion 10. This back wall 12 is opaque except for a light opening 14, best shown in FIG. 5. A person using the invention holds the tube 10 in position so that he can look into the interior of the tube through the light opening 14, which preferably has a lens 15 of a focal length approximating the distance of the light opening 14 from the target.

The front end of the tube 10 has a tube section 16 which is attached to the rest of the tube 10 by a collar 18 which holds the front section 16 in alignment with the rearward section of the tube 10. The preferred construction is shown in section in FIG. 2 where the collar 18 fits over a ring 20 rigidly secured to the forward end of the rearward portion of the tube 10. The connection illustrated permits some telescopic movement of the front section 16 on the portion of the tube 10 over which it projects. The connection between the front section 16 and the rest of the tube 10 can be modified to obtain more telescopic movement or to obtain no telescopic movement, as desired.

There is a partition 22 extending across the inside of the tube 10 adjacent to the front section 16. The front surface of the partition 22 is covered with reflective material 24 which may be made of aluminum foil or any other inexpensive material which will reflect light. The front section 16 is closed by a circular front wall 26, and there is an outside cover 28 which is opaque or possibly semi-translucent to prevent any substantial amount of light from entering the tube through the front wall 26.

The object of the construction shown in FIG. 2, and a feature of the invention, is to admit light into the space between the partition 22 and the transparent front wall 26. Such light enters through the transparent circumferential wall of the front section 16. Much of the light that enters through the circumferential wall of the front section 16 in directions that approach the partition 22, is reflected by the surfaces 24 (FIG. 3) forward toward the front wall 26.

This admission of light into the tube through its circumferential sidewalls, instead of through the forward end wall, is a distinct departure from the constructions used on the prior art kaleidoscopes. The advantages are that it permits the use of a target 30 which is secured to the outside of the front wall 26 and which is covered by the opaque sheet 28. The nature of the target will be described more fully hereinafter.

Reflectors 32 and 34 are connected at opposite ends with the backwall 12 and the partition 22. These reflectors 32 and 34 (FIG. 4) are at an angle of substantially 45 degress to one another so that an observer looking through the light opening 14 will see an image that is made up of multi-sectors; there being 8 sectors if the reflectors 32 and 34 are at approximately 45 degrees to one another where they come together. This is in accordance with conventional kaleidoscope construction.

At its forward end, the reflector 34 is supported by the partition 22 from a strip 34 secured to the partition 22 as an integral part of the partition. There is a Vee-shaped opening 36 through the partition 22.

In addition to the way in which the light is applied to the front of the target instead of entering the viewing tube through the front wall of the tube, the target 30 is completely different from those used on other kaleidoscopic constructions. Instead of rotating the tube or otherwise moving to change the appearance of a target, this invention has the target made of plastic and coated with material that changes color when subject to even a light pressure. The transparent front wall 26 of the tube is stiff and the target 30 is made of flexible plastic material. A person using the invention applies pressure to the back of the plastic sheet 30 and compresses it against the outside surface of the front wall 26. This changes the light transmitted from the plastic cover over those portions of the front wall 26 to which the pressure is applied and in accordance with the degree of pressure. Each area where such color changes occur becomes a portion of an eight segment area as viewed by a person looking through the light opening 14 as an eyepiece. Thus the operation of the invention differs greatly from convention kaleidoscopes where the tube has to be rotated or otherwise moved in order to produce any change in target. The fact that the changes in the target are effected by pressure applied by one or more fingers of the observer makes the device more interesting and has a calming effect on nervous people.

I prefer to use a material that changes color in response to pressure against the outside cover 28. Such material for the target 30 can be purchased from A.R.C., a division of Athol Industries, Inc. of 200 Fifth Ave., New York City, N.Y. 10010.

The preferred embodiment of the invention has been illustrated and described but changes and modifications can be made, and some features can be used in different combinations as described in the claims.

What is claimed is:

1. An amusement device including in combination a tube having a longitudinally extending side wall, a front wall at one end of the tube, a back wall at the other end of the tube, and an observation opening in the back wall for looking lengthwise into the tube, the front wall being substantially opaque over the area of the front wall that can be observed by looking through said opening in the back wall, reflecting surfaces within the tube and in angular relation to one another in planes normal to the direction of sight between said opening in the back wall and a partition located in the tube and spaced from the back and front walls of the tube and adjacent to the forward ends of the reflectors between the back and front walls, at least a portion of the tube between the front wall and said partition being made of light transmitting material and comprising a window near the front wall and in position to serve as a window to admit light from outside the tube in directions to illuminate the inside surface of the front wall as a target.

2. The amusement device described in claim 1 characterized by the front surface of the partition being a light reflecting surface that reflects light, that enters the light transmitting material of the tube as rearwardly directed rays, to reflect at least a part of the rearwardly directed rays forward to illuminate the inside surface of the front wall.

3. The amusement device described in claim 1 characterized by the length of the light transmitting material of the tube being at least as long, lengthwise of the tube, as one-third of the diameter of the tube at the light transmitting portion of the wall of the tube.

4. The amusement device described in claim 1 characterized by the partition having a triangular opening therethrough, the opening being of generally segmental shape and having two sides that come together at an angle of approximately 45 degrees.

5. The amusement device described in claim 4 characterized by the light opening in the back wall being substantially tangent to the inside planes of the reflecting surfaces in the tube, and having alens with a focal length approximately equal to the distance from the eye opening to the target.

6. The amusement device described in claim 1 characterized by the front end of the tube having a transparent layer of material and having a thin flexible layer of plastic secured to the outside surface of said transparent layer and having a thin layer of material and thin flexible layer, the thin layer of colored material being so thin that change in pressure on said thin layer causes it to change the light that it reflects at the areas of different pressure.

7. The amusement device described in claim 1 characterized by the tube comprising two tubular sections, one of the sections being a rearward section including the back wall and the partition connected by a portion of the side wall, and the other section including the front wall and the part of the side wall that includes the light transmitting material that admits light from outside the tube in directions to illuminate the inside surface of the front wall.

8. The amusement device described in claim 2 characterized by the partition having an opening in alignment with the line of sight from the opening in the back wall to the area of the front wall that is viewed through said opening in the back wall, the area of the partition that confronts the front wall and that surrounds the opening in the partition which is in alignment with said line of sight being covered with a material that is highly reflective to light.

9. The amusement device described in claim 8 characterized by the material that is highly reflective to light being thin and of insufficient strength to support the forward ends of said reflective surfaces within the tube, and a stiff backing structure immediately behind said material that is highly reflective to light and that supports the forward ends of said reflecting surfaces within the tube.

10. The amusement device described in claim 9 characterized by the material that is highly reflective to light being a thin sheet of polished aluminum with an opening therein that aligns with the space between the reflecting surfaces within the tube that are in angular relation to one another.

* * * * *